Nov. 23, 1965  J. J. LOVINGHAM  3,218,799
ROCKET THRUST CHAMBER CONSTRUCTION
Filed Feb. 5, 1963  2 Sheets-Sheet 1

INVENTOR.
JOSEPH J. LOVINGHAM
BY
*William R. Wright*
AGENT

Nov. 23, 1965  J. J. LOVINGHAM  3,218,799
ROCKET THRUST CHAMBER CONSTRUCTION
Filed Feb. 5, 1963  2 Sheets-Sheet 2

INVENTOR.
JOSEPH J. LOVINGHAM

BY
*William R. Wright Jr.*
AGENT

United States Patent Office 3,218,799
Patented Nov. 23, 1965

3,218,799
ROCKET THRUST CHAMBER CONSTRUCTION
Joseph J. Lovingham, Madison, N.J., assignor to Thiokol Chemical Corporation, Bristol, Pa., a corporation of Delaware
Filed Feb. 5, 1963, Ser. No. 256,458
2 Claims. (Cl. 60—35.6)

The invention relates in general to coolant-jacketed thrust chambers for rocket or other type reaction motors, and has particular reference to thrust chambers which include comparatively thin coaxial inner and outer walls and means interposed between the walls to separate them and define coolant passages.

Thin walls are desirable in a coolant-jacketed thrust chamber of this kind because of the weight reduction so essential to any airborne device. However, a serious problem presents itself due to the unequal thermal expansion and contraction to which the thin walls are subjected during operational use. For instance, the temperature at the inner surface of the inner wall of a coolant-jacketed rocket thrust chamber when in operation may be of the order of 1400° F. and 500° F. at its outer surface, while the temperature of the outer wall may be so low that it can be touched safely with one's hand (of the order of 150° F.). It, therefore, should be apparent that the inner wall will expand at the commencement of operation, both radially and axially, to such a degree that stresses in these directions will be transmitted through the between-walls separator means to the expansion-resistant cooler outer wall.

Prior to my present invention, the between-walls separator means has been united in a rigidly integral manner with both the inner wall and the outer wall in such a manner that the unequal thermal expansion of the walls has resulted in buckling and other distortion which can cause physical damage to the thrust chamber and a poorly defined coolant passage.

It, therefore, is my primary object to provide an improved construction for thrust chambers of the type described which will afford desirable flexibility between the inner and outer walls.

To be more explicit, I achieve necessary coaxial positioning and rigidity of the coolant-jacketed thrust chamber structure by winding a separator member around the inner wall and securing its edge integrally to the latter by suitable means, such as spot welding, while leaving its opposite edge unattached and in substantially continuous contact only with the inner face of the other wall. The manufacturing tolerances between the unattached edge of the separator member and its adjacent wall are such that there will be a reasonably efficient fluid seal at this juncture to insure necessary coolant flow direction in the spiral channel provided between adjacent convolutions of the separator member. Thereafter, during operational use of the thrust chamber, when thermal expansion of the inner wall causes the unattached edge of the separator member to bear firmly against the inner face of its adjacent wall, relative radial and axial movement between these parts can occur to obviate buckling or other distortion.

A further object of the invention is to construct the outer part of the separator member as at least one thin resilient flange that can flex radially and axially under excessive thermal expansion and thereby further prevent any distortion of the thrust chamber.

Another object is to provide means to support a longitudinal elastomer strip at the unattached outer edge of the separator member for continual firm contact with the outer wall to produce an even more efficient fluid seal.

Still further objects of the invention will become apparent as the following specific description is read in connection with the accompanying drawing, in which.

Figure 1:
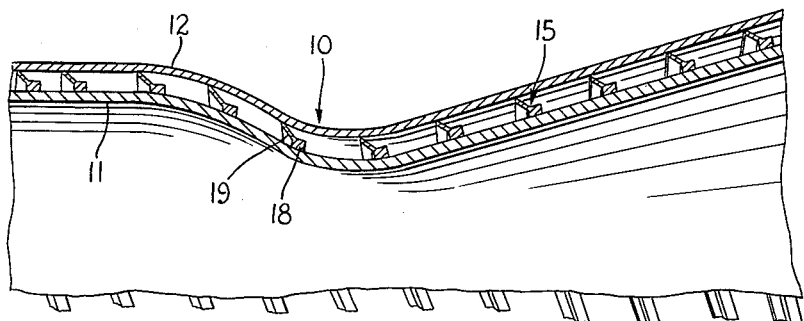
FIGURE 1 is a side elevational view of one embodiment of the improved coolant-jacketed thrust chamber of a rocket engine, showing the same partly in axial vertical section.

Referring now in detail to the drawings, wherein like reference characters designate corresponding parts in the several views, the numeral 10 refers to the exemplary thrust chamber of a rocket engine having the conventional longitudinal contour to include a cylindrical upstreamward combustion chamber and downstreamward convergent-divergent nozzle.

Thrust chamber 10 in each instance includes coaxial inner and outer walls 11 and 12, respectively, of different diameters to provide a suitable space therebetween to accommodate coolant flow passage defining means. Longitudinally uniform spacing between inner wall 11 and outer wall 12 is maintained by respective inlet and outlet manifold structure (not shown) with the aid of a flexible separator member 15 of resilient material which is disposed spirally between walls 11 and 12 to define a spiral coolant flow passage 16.

The desired flexibility between inner wall 11 and outer wall 12 is obtained by securing separator member 15 integrally to only one of either of said walls. It is preferred for convenience in assembly to secure separator member 15 to inner wall 11. This may be done by any suitable means, such as spot welding.

Figure 2:
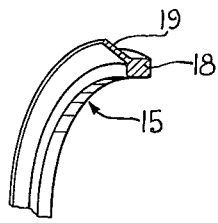
FIGURE 2 is a cross-section of the separator member of FIGURE 1.

In the embodiment represented in FIGURES 1 and 2, separator member 15 is substantially tadpole-shaped in cross-section and comprises a relatively thick inner base portion 18 that is secured integrally to inner wall 11 and an integral thin and laterally flexible outer flange portion 19 that is unattached to outer wall 12 and has its outer edge in substantially continuous sealing contact with the inner peripheral face of said outer wall. In other words, under non-operating conditions, there will be normal tolerances, whereas at operating temperatures the outer edge of the separator member 15 will be in tightly closed contact with outer wall 12.

The structural form of separator member 15 lends itself to fabrication by the extrusion process in which base portion 18 and flange portion 19 are completely integral, or one-piece, in construction. Also in the interest of economy and rapidity of manufacture, the various other embodiments described later herein may be extruded.

It is preferred to make inner base portion 18 of separator member 15 substantially square in cross-section and to arrange it with its outer flat face in tangential secured engagement with the outer face of inner wall 11. Outer flange portion 19 of separator member 15 is shown as being inclined out of normal to outer wall 12, i.e., not perpendicular to a plane tangential to said wall. Because of this inclination and the inherent flexibility of flange 19, the latter will be flexed laterally when expanded excessively under the influence of high fuel combustion temperatures and thus will not exert unyielding distorting pressure on outer wall 12.

Figure 3:
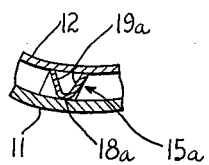
FIGURE 3 is a partial axial section of the thrust chamber having a modified form of separator member.

FIGURE 3 shows a modified form of separator member 15a which is substantially channel-shaped in cross-section and arranged with its two side flange portions 19a—19a outwardly presented for edgewise substantially continuous sealing contact with outer wall 12 and with its apical base portion 18a secured to inner wall 11 by welding. Side flange portions 19a—19a diverge at such an obtuse angle that they will be easily flexed in opposite directions by excessive pressure on outer wall 12 to afford the necessary flexibility between the inner and outer walls.

Figure 4:
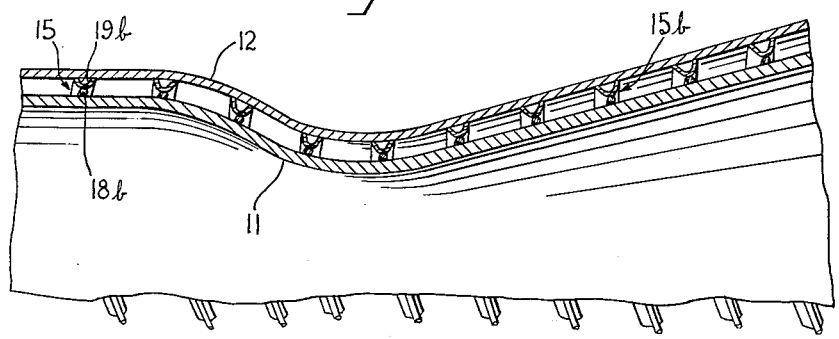
FIGURE 4 is a view similar to FIGURE 3 showing a further modification of the separator member.

For increased flexibility, separator member 15b, as shown in FIGURE 4, resembles separator member 15a of the FIGURE 3 embodiment in general, but has a lengthwise wire-shaped base portion 18b formed integral with the apical portion of the channel structure formed by divergent flange portions 19b—19b and underlying the said apical portion. As in the preceding embodiments, the unattached edges of flange portions 19b—19b are in substantially continuous sealing contact with outer wall 12. Base portion 18b of separator member 15b is secured to inner wall 11 as by spot welding.

Figure 5:
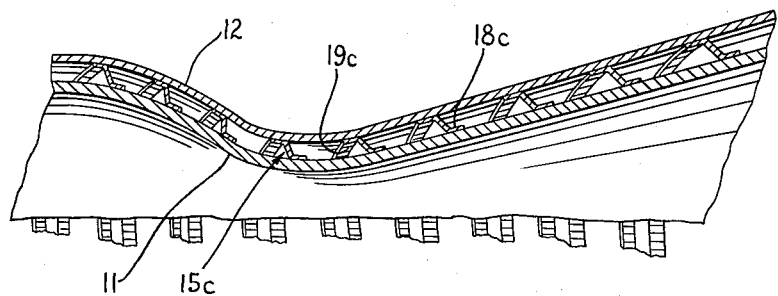
FIGURE 5 is a similar view showing another modified form of separator member.

In FIGURE 5, another embodiment is shown, in accordance with which separator member 15c is substantially Z-shaped in cross-section. In this instance, there are an inner longitudinal flange 18c, which constitutes the inner-wall-secured base portion of separator member 15c, and outer unattached flange portions 19c—19c which are in substantially continuous sealing contact with the outer wall 12.

Figure 6:
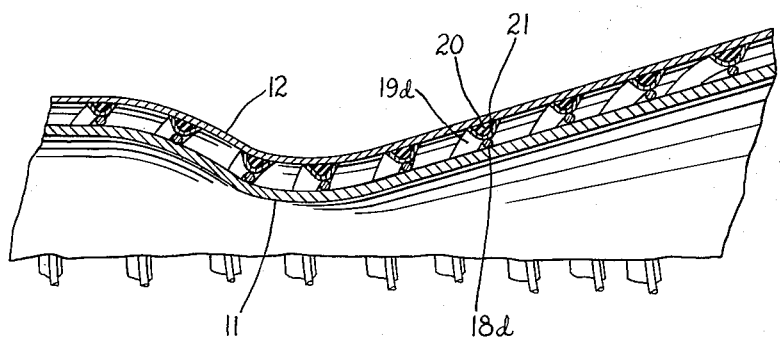
FIGURE 6 is a similar view representing a still further embodiment of the separator member.
Figure 7:
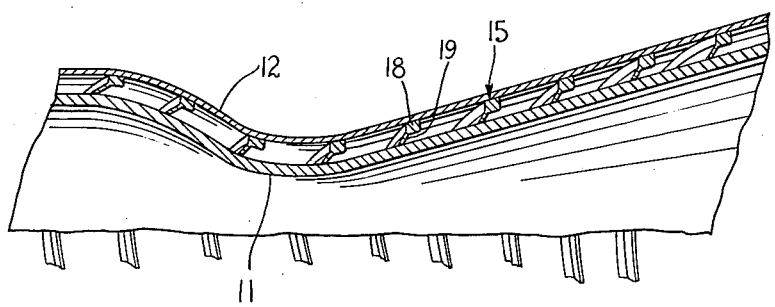
FIGURE 7 is a view similar to FIGURE 1 with the separator attached to the inner surface of the outer wall.

FIGURE 6 discloses a still further embodiment wherein separator member 15d is almost identical in construction with separator member 15c of the FIGURE 5 embodiment. The difference resides in the transversely curved substantially U-shape of the channel member that affords a pair of outwardly concave divergent flange portions 19d—19d which are integral with wire-like base portion 18d. Base portion 18d is welded or otherwise secured to inner wall 11 as in the other embodiments. To the separator member 15d there is added an elastomer 20 which is inset in the valley between flange portions 19d—19d. Elastomer 20 is semi-spherical in cross-section and has its flat outwardly presented face 21 projecting slightly beyond the free edges of flange portions 19d—19d for sealing contact with outer wall 12 under all conditions. At an operational temperature of about 150° F., contact with outer wall 12 will not damage elastomer 20.

While there have been shown and described and pointed out the fundamental novel features of this invention as applied to a few structural embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

I claim:
1. A coolant jacketed thrust chamber for rocket motors comprising, in combination, coaxial radially spaced inner and outer walls of circular cross-section; a separator of resilient material spirally interposed between said walls and dividing the space therebetween into a continuous spiral coolant passage; said separator being channel shaped in cross-section and having an apical base portion, two divergent side flange portions and a longitudinal wire-like base portion located underneath and integral with the apical portion; and brazing means integrally securing and supporting said wire-like base portion to and on one of said walls with said side flange portions unattached and extending toward the other of said walls to be substantially in continuous contact therewith before motor operation; said unattached flange portions being movable and flexed into fluid tight sealing engagement with said other wall upon thermal expansion of said one supporting wall during motor operation to permit distortion-free relative thermal expansion between said inner and outer walls.

2. The combination recited in claim 1, and an elongated elastomer arranged in longitudinally extending position in the channel formed by said divergent side flange portions and projecting radially therefrom for sealing contact with said other wall during motor operation.

References Cited by the Examiner
UNITED STATES PATENTS

| | | | |
|---|---|---|---|
| 2,392,182 | 1/1946 | Payne | 277—206 |
| 2,745,249 | 5/1956 | Sanborn | 60—35.6 |
| 2,889,183 | 6/1959 | Peras | 277—206 |
| 2,915,292 | 12/1959 | Gross | 165—89 |

FOREIGN PATENTS

| | | |
|---|---|---|
| 326,278 | 3/1930 | Great Britain. |
| 459,093 | 1/1937 | Great Britain. |

OTHER REFERENCES

German printed application No. 1,008,970, May 23, 1957.

Stambler, I. Small Engines Key to ICBM Accuracy, Space/Aeronautics, October 1958. Pp. 30–31.

SAMUEL LEVINE, *Primary Examiner.*

ABRAM BLUM, *Examiner.*